United States Patent [19]

Larkin et al.

[11] E Re. 28,872

[45] Reissued June 22, 1976

[54] TRIMMING APPARATUS FOR TUBULAR BODIES

[75] Inventors: Daniel J. Larkin, Seattle; Robert L. Hunt, Bellevue, both of Wash.

[73] Assignee: National Can Corporation, Chicago, Ill.

[22] Filed: Feb. 21, 1975

[21] Appl. No.: 551,859

Related U.S. Patent Documents

Reissue of:

[64] Patent No.: 3,838,653
Issued: Oct. 1, 1974
Appl. No.: 353,401
Filed: Apr. 23, 1973

[52] U.S. Cl. ..... 113/7 R; 72/71
[51] Int. Cl.[2] ..... B21D 51/26
[58] Field of Search ..... 113/7 R, 7 A, 1 G, 115; 72/71, 338; 83/54, 178, 192, 193

[56] References Cited

UNITED STATES PATENTS

| | | | |
|---|---|---|---|
| 1,589,595 | 6/1926 | Hitchcock | 72/703 |
| 2,298,366 | 10/1942 | Gladfelter et al. | 113/7 R |
| 3,425,251 | 2/1969 | Maytag | 72/71 |

*Primary Examiner*—Lowell A. Larson
*Attorney, Agent, or Firm*—James E. Anderson

[57] ABSTRACT

An apparatus for trimming uneven edges from drawn and ironed metal bodies, such as cans, and breaking, knurling and discarding the scrap ring. The apparatus has oppositely rotating parallel shafts, one having an axially rigid supporting member, cutter and knurling roller at a free end on which a can is supported and the other having an axially rigid rotating wheel with a blade and knurling member peripherally mounted on adjacent sectors thereof. The blade cooperates with the edge of the cutter which is remote from the free end to trim the edge and the knurling member cooperates with the knurling roller. The members mounted on the first shaft and the teeth of the knurling member are configured to provide superior, relatively trouble-free operation.

9 Claims, 8 Drawing Figures

TRIMMING APPARATUS FOR TUBULAR BODIES

Matter enclosed in heavy brackets [ ] appears in the original patent but forms no part of this reissue specification; matter printed in italics indicates the additions made by reissue.

BACKGROUND OF THE INVENTION

This invention relates generally to apparatus for trimming the uneven edges from drawn and ironed tubular metal bodies, such as aluminum or steel cans, and disposing of the scrap.

Specifically, it relates to trimmers of the type generally described in U.S. Pat. No. 3,425,251 to J. H. Maytag, entitled Can Trimmer and Scrap Disposing Mechanism. Trimmers of this type, which are used primarily for trimming of cans, have evidenced many problems which have made their operation unsatisfactorily inefficient and which have led to defects in cans.

Trimmers of this type have two main parallel shafts. A spindle is formed at a free end of one of these shafts. Can bodies are mounted over the spindle, which has a cutter and a knurling roller associated therewith. A tool wheel, carrying a cutter sector and a spaced knurling sector, is mounted on the second of the main shafts. The cutter sector and the knurling sector cooperate with the cutter and knurling roller, respectively, to sever an endless ring (which includes the uneven edge) of scrap from a can and cut, corrugate and discard the scrap ring from the area of operation.

As previously indicated, there are many problems with such apparatus. In particular, previously known devices of this type have caused many defects in trimmed container bodies. Most of these defects are imperfections in the trimmed edge, many of which can lead to more obviously critical defects at the time of seaming a container end to the container body. Such seaming puts much stress on the container edge and tiny defects can result in an unusable container.

A greater number of these defects result from the type of mandrel used to support a can body during trimming and knurling, and the configuration and orientation of the cutter and knurling roller used. The prior known devices exhibited a great deal of axial instability which often led to somewhat random dimensions and accompanying defects. A related problem was the lack of positive drive rotation of the container bodies on the spindle because of an inconsistent material pinch between the mandrel and the loading cylinder used for holding the container body on the mandrel during trimming.

A further related problem was the difficulty of spindle adjustment to accomodate tubular bodies of varying sizes. Another problem related to the existence of "stumbling points" on the spindle which had a tendency to introduce serious container defects.

Still another problem in prior known trimmers of this general type is caused by the knurling apparatus used to sever the trimmed endless ring of scrap. Such knurled scrap had a tendency to be uncontrolled in the direction in which it was discarded. In a high speed operation, this condition could sometimes result in scrap contacting the edge of a trimmed can which would cause an imperfection which later could result in a defect during seaming. It could also interfere with the operation in other apparent ways.

SUMMARY OF THE INVENTION

This invention overcomes the aforementioned problems and provides a greatly simplified and reliable trimming apparatus which is much more efficient than prior known devices. The trimming apparatus of this invention has a supporting member, cutter, and knurling roller mounted at the free end of a body-turning shaft in a manner overcoming many of the aforementioned problems. These elements are uniquely configured to provide trouble free, efficient, and reliable operation. Unlike the cutters of prior devices, in this invention the cutter edge remote from the free end of the body-turning shaft cooperates with a blade mounted on a cooperating rotating wheel. Unlike prior known devices, there is much more axial stability during trimming by virtue of the rigid alignment of parts as will be described.

In the apparatus of this invention, a knurling member is peripherally mounted on the rotating tool-carrying wheel in a sector directly adjacent the sector of the aforementioned blade. Immediately after trimming, the endless ring of scrap is broken, knurled, and discarded, without the necessity of any delay. The knurling member has uniquely configured teeth which hold the endless ring and break it across its entire width at one time, prior to corrugating and discarding it. The knurling member teeth adjacent to the blade extend radially further than the remaining teeth to mesh more deeply to hold and break the ring across its entire width. Many other details of this invention will be described in detail hereinafter.

OBJECTS OF THE INVENTION

One object of this invention is to provide an efficient and relatively trouble free timmer apparatus for trimming the uneven edges from drawn and ironed metal bodies.

Another object of this invention is to provide a trimmer of the class described which overcomes the aforementioned problems.

Another object of this invention is to provide a trimmer apparaus which drastically reduces defects in trimmed bodies.

Yet another object of this invention is to provide a trimmer apparatus of the class described which eliminates complicated adjustment procedures and which is efficient in operation.

Still another object of this invention is to provide a trimmer apparatus of the class described which has a unique configuration of parts to accurately discard from the operational area the scrap trimmed from the metal bodies.

Another object of this invention is to provide a trimmer apparatus of the class described which is simplified in structure and in operation.

BRIEF DESCRIPTION OF THE DRAWINGS

These and other important objects will become apparent from the following description and from the drawings showing preferred embodiments wherein.

Throughout the several drawings, like elements and arts are designated by like numerals.

DETAILED DESCRIPTION OF PREFERRED EMBODIMENTS

Figure 1:
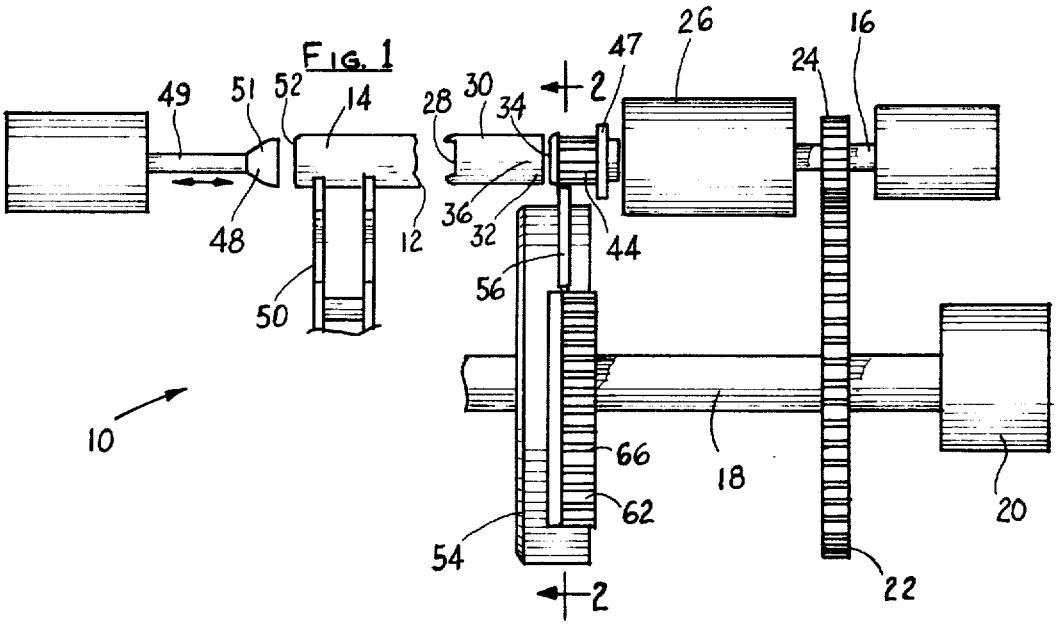
FIG. 1 is a front elevation of the main portions of the trimmer apparatus of this invention.

FIG. 1 illustrates the main portion of the trimming pparatus 10 of this invention which is used for trimiing the rough, uneven edge 12 from a drawn and oned tubular metal body 14, such as an aluminum or teel container body of the type used in forming a twoiece container. Trimming apparatus 10 includes two ubstantially parallel shafts, designated body-turning haft 16 and tool shaft 18. Drive means 20, such as an lectric motor, turns tool shaft 18. Body-turning shaft 6 is driven through synchronizing gears 22 and 24 by ool shaft 18 to turn in a direction counter to that of ool shaft 18. Tool shaft 18 and body-turning shaft 16 re spaced apart by a constant distance.

Figure 4:
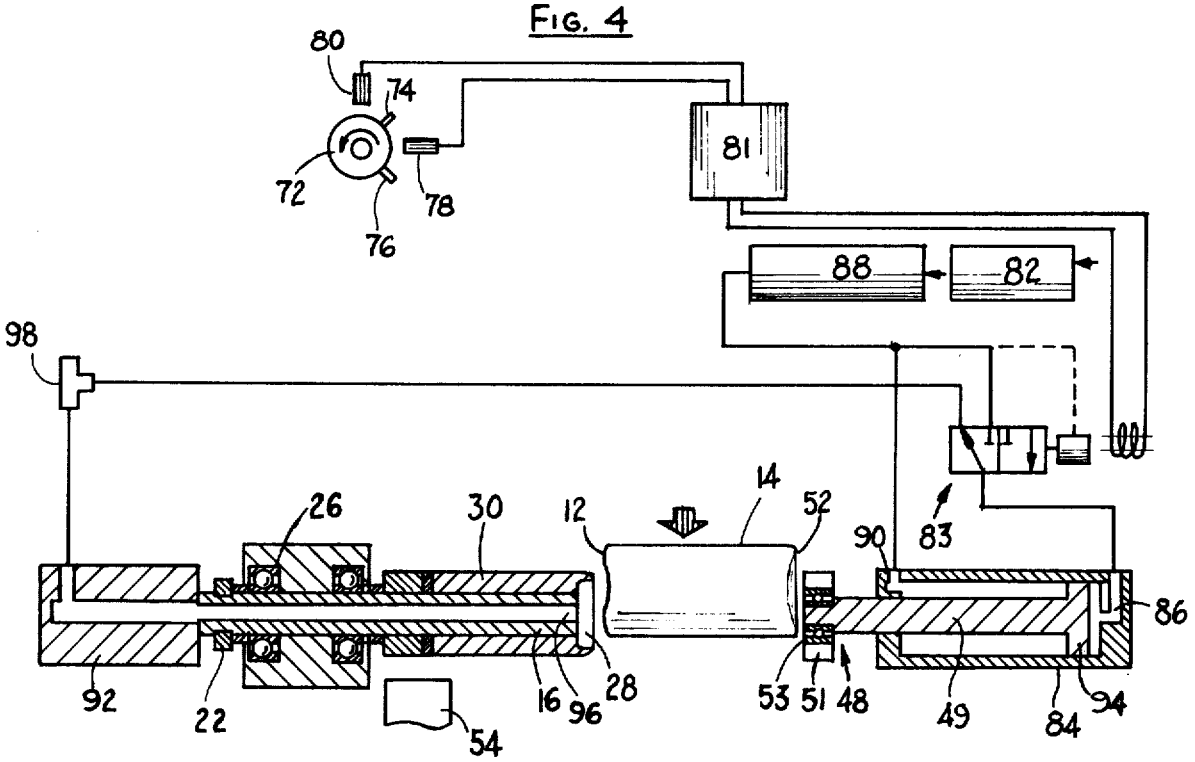
FIG. 4 is a partially schematic view of the trimmer pparatus of this invention illustrating the indexing ycle.

Body-turning shaft 16, as shown in FIGS. 1 and 4 hrough 7, turns and is supported within bearing means 6. Body-turning shaft 16 has a free end 28. A generlly cylindrical, rigid body-supporting member 30 is oncentrically attached to shaft 16 at free end 28. Suporting member 30 turns with shaft 16.

Affixed to shaft 16 adjacent inner end 32 thereof is a pacer member 34. Spacer 34 extends to a lesser radial limension than body-supporting member 30, to avoid nterference with the uneven edge of a tubular metal ody being loaded onto supporting member 30.

An annular cutter member 36 is fixedly and concenrically mounted on body-turning shaft 16 inwardly from free end 28) of supporting member 30 and pacer 34. Cutter member 36 has a circumferential urface 38. Edge 40 thereof, which is closest to free end 8, has a radial dimension which is less than the radial limension, or the greatest radial dimension, of supportng member 30. This dimensioning will permit insertion that is, loading) of tubular metal bodies onto supportng member 30 and over cutter member 36 without nterference between the uneven body edge 12 and utter member 36. In the preferred embodiment hown, edge 40 is also of lesser radial dimension than pacer member 34. As will be described further herein, ircumferential surface 38 has a cutter edge 42 which is xially remote from free end 28 and which cooperates o sever an endless ring from metal body 14.

Figure 2:
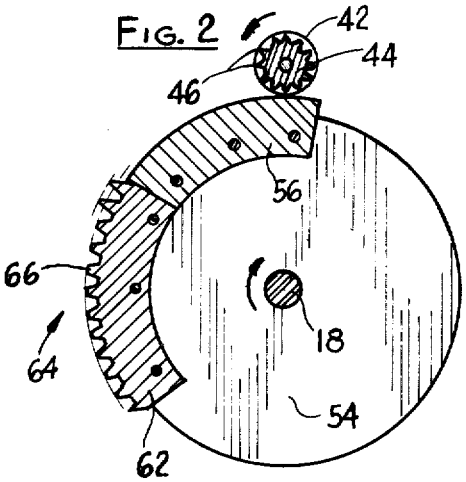
FIG. 2 is a side sectional view taken along line 2—2 as shown in FIG. 1.
Figure 3:
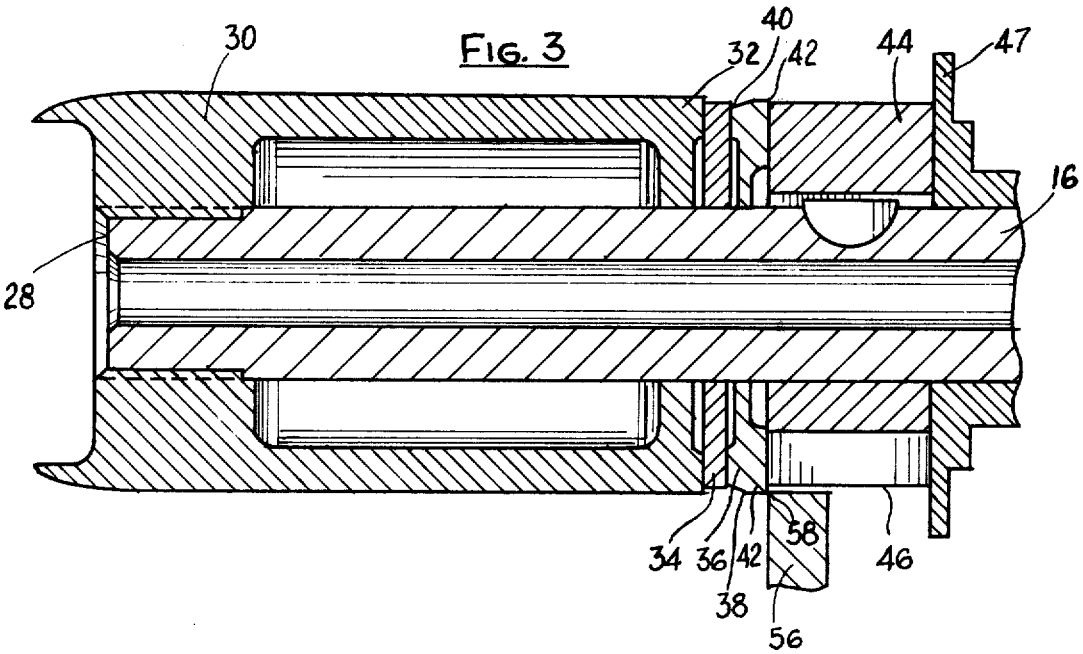
FIG. 3 is a sectional view of the workrest tooling on hich a tubular metal body is mounted during trimiing, taken along its axis.

Axially inwardly of cutter member 42 is a knurling oller 44, shown best in FIGS. 1 through 3. Knurling oller 44 is attached concentrically to body-turning haft 16 and has circumferentially spaced teeth 46 each xtending radially to a position radially inward of circumferential surface 38 of cutter member 36. Again, the dimensioning is critical to prevent interference during loading of tubular bodies 14, the uneven edges 12 of which will extend to a position over knurling roller 44. Mounted inwardly of knurling roller 44 is a shield member 47 which will prevent scrap metal (trimmed from bodies 14) from interfering with other portions of the apparatus, as will become apparent herein.

Supporting member 30, spacer member 34, cutter member 36 and knurling roller 44 have a constant, rigid overall axial dimension throughout all portions of the operating cycles of the trimmer apparatus of this invention.

A loading ram 48, which may be operated and timed as will be further briefly described hereinafter, functions to load a tubular metal body 14 (such as a can), which was supplied and positioned in axial alignment with supporting member 30 by a starwheel 50, onto supporting member 30. Loading ram 48 also serves to hold body 14, by its closed end 52, in steady fully loaded position on supporting member 30 with uneven edge 12 extending over knurling roller 44. Ram 48 has shaft 49 and a head 51 which is free-wheeling on shaft 49 on bearing 53 (see FIG. 4). This arrangement allows head 51 to spin with tubular bodies 14 during trimming. Ram 48 will later be retracted as will later briefly be described.

Mounted on tool shaft 18 is rotating wheel 54. Wheel 54 is driven at a predetermined speed and, by virtue of gears 22 and 24, has an edge linear velocity generally corresponding with the edge linear velocity of cutter member 36 and knurling roller 44.

Figure 6:
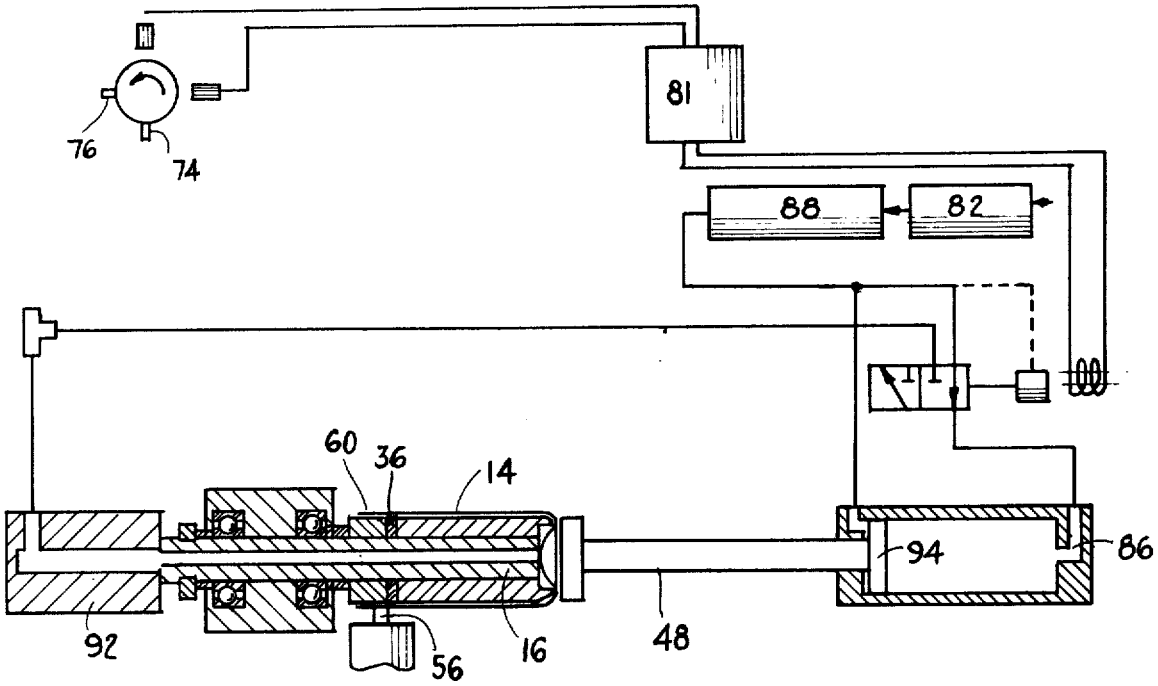

As shown best in FIGS. 1 and 2, wheel 54 has a blade 56 circumferentially mounted thereon over a sector thereof. Blade 56 has a peripheral edge 58 which is aligned to cooperate with cutter edge 42 of cutter member 36. An endless ring 60 (shown in FIGS. 6 and 7), including uneven edge 12, is cut from tubular body 14 by the counter rotational cooperation of peripheral edge 58 of blade 56 with cutter edge 42 of cutter member 36.

Circumferentially mounted to rotating wheel 54 on a sector adjacent (with no spacing) *and abutting* the sector of blade 56 is a knurling member 62. Knurling member 62 has a peripheral portion 64 with radially extending, circumferentially spaced teeth 66 spaced apart and aligned to mesh with teeth 46 of knurling roller 44. The cooperation of teeth 66 of knurling member 62 and teeth 46 of knurling roller 44 breaks, knurls and discards the endless ring trimmed from tubular body 14. As soon as the cutting operaiton is completed, the breaking and knurling operation begins. The blade sector and the knurling sector are adjacent and no time is wasted between operations. This lends to efficient operation of the trimmer.

Figure 8:
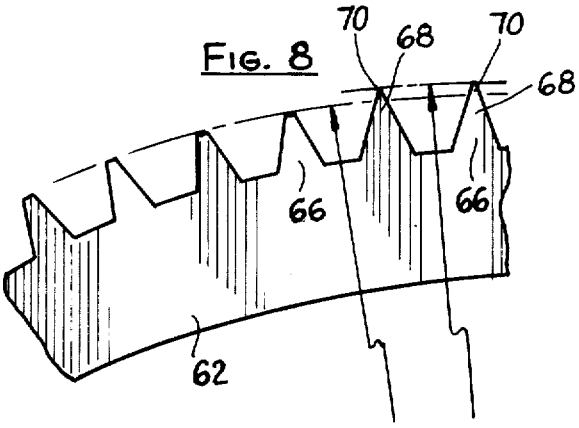
FIG. 8 is a fragmentary view of the knurling member f this invention showing the unique configuration of eeth used for breaking an endless ring of metal immed from a drawn and ironed tubular metal body.

In the preferred embodiment shown, each of the teeth of both knurling member 62 and knurling roller 44 have substantially constant cross-sectional configurations (at any axial location). That is, [ the intersections of ] all planes *extending through knurling roller 42 and knurling member 62 and perpendicular to the axes of knurling roller 42 and knurling members 62, at axially spaced locations* normal to shafts 16 and 18, [ with each tooth ] are substantially congruent, *as shown in FIGS. 2 and 8*. Furthermore, the several teeth 46 of knurling roller 44 are of congruent shape and size. The same is true for the teeth 66 of knurling member 62 except for the initial teeth 68 which extend radially further than the remaining teeth of knurling member 62. As seen in FIGS. 2 and 8, initial teeth 68 are tapered to points 70 which mesh more deeply with knurling roller 44 and, in so meshing, grip the endless ring of scrap and while gripping it break it across its entire width to initiate the knurling and discarding thereof.

In the preferred embodiment, two such extended teeth are used for the purpose of facilitating breaking of the endless ring trimmings, and such has been found to be very successful in even, straight ring breakage. However, more than two such extended teeth may be used. Ring breakage using initial extended teeth eliminates substantial erratic ring breakage and dispersal.

Referring again to the overall axial rigidity of the parts mounted on body-turning shaft 16, it can be seen that the axial length of a trimmed body will be substantially equal to the distance between free end 28 and cutter edge 42. Spacer member 34, if used, may be chosen to have an axial width which together with the other parts on shaft 16 will provide the desired trimmed height.

Briefly, FIGS. 4 through 7 illustrate schematically the operation of the trimmer apparatus of this invention and illustrate certain preferred apparatus for use with the main portions already described. The trimmer preferably functions by a combination of electrical drive power as described, mechanical and pneumatic positioning and electronic control. An electric motor, as drive means 20, provides the machine power to tool shaft 18, and to body-turning shaft 16 through gearing as previously described. Starwheel 50 is intermittently rotated through well known linkage means (not shown) from shaft 18, such as a geneva device, to advance tubular bodies for loading, and to remove trimmed unloaded bodies.

Also fixed to tool shaft 18 is a program drum 72 having two flags, 74 and 76, each aligned in a separate plane with a corresponding proximity sensor. Flag 74 corresponds with proximity sensor 78 and flag 76 corresponds with proximity sensor 80. As the flags pass over their corresponding sensors they initiate timed control signals through well-known electronic controls (numeral 81), for actuating solenoid-controlled air valves of the system, such as load value 83 which controls the operation of load cylinder 84. Achieving proper timing through such apparatus would be obvious to one skilled in the art and familiar with this invention.

Preferably, a pneumatic system operates loading ram 48. In one period of the operation, air from pressure source 82 enters cylinder 84 through orifice 86 to extend loading ram 48 for loading and holding as previously described. Thereafter, air from pressure source 82 (and suitable air pressure control and treatment apparatus 88) enters cylinder 84 through orifice 90 to retract loading ram 48 for removal of a trimmed tubular body and indexing of starwheel 50.

During such retraction of loading ram 48, air exhausted back through orifice 86 is directed by operation of appropriate valving through rotary union 92 and through passage 96 defined in body-turning shaft 16 to strip a trimmed tubular body from body-supporting member 30.

The sequence of operation of this preferred embodiment may briefly be described as follows. At start-up of the trimmer, tool shaft 18 and program drum 18 are rotated a sufficient distance to provide an impulse from flag 74 to proximity sensor 78 to reset the device for proper sequencing. Upon continued turning of tool shaft 18, as shown in FIG. 4, starwheel 50 will index to bring an untrimmed tubular body into axial alignment with body-turning shaft 16 and loading ram 48. Load valve 83 is de-energized allowing air through orifice 90 to hold piston 94 in the retracted position. This portion of the operation may be described as the index cycle.

Figure 5:
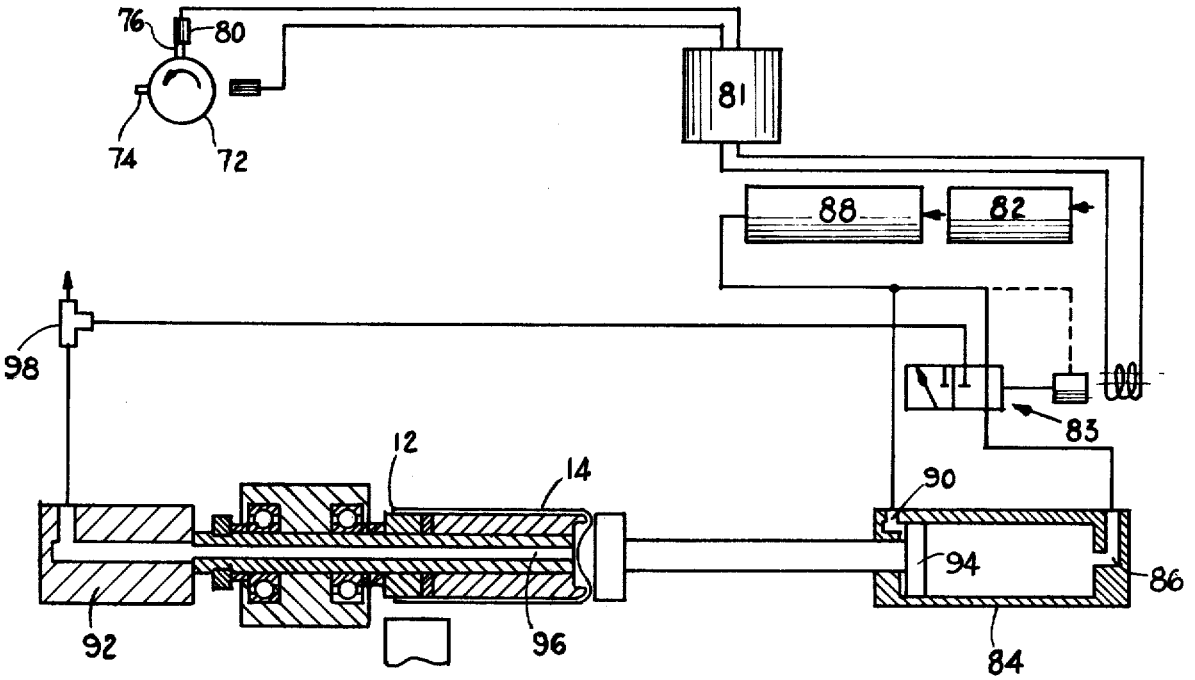
FIGS. 5 through 7 are views as in FIG. 4 but illustratıg the loading, trimming and unloading cycles, respecvely.

Shortly after completion of the index cycle, flag 76 will pass over sensor 80 and, through logic circuitry, energize load valve 83. Air is admitted into cylinder 84 through orifice 86 to force the loading as described. This is shown in FIG. 5 and may be described as the load cycle. Air trapped inside the can being loaded onto supporting member 30 is exhausted through passage 96 in body-turning shaft 16, rotary union 92 and quick release valve 98 to the atmosphere.

After the can is firmly in position on supporting member 30, blade 56 sweeps by the rotating tubular body 14 and, cooperating with cutter edge 42, trims endless ring 60 from body 14. See FIG. 6. Immediately after the trim action is completed, knurling member 62 engages knurling roller 44 to trap, break and begin to knurl, or corrugate, the scrap from the trimmed can. This cycle may be described as the trim cycle.

Figure 7:
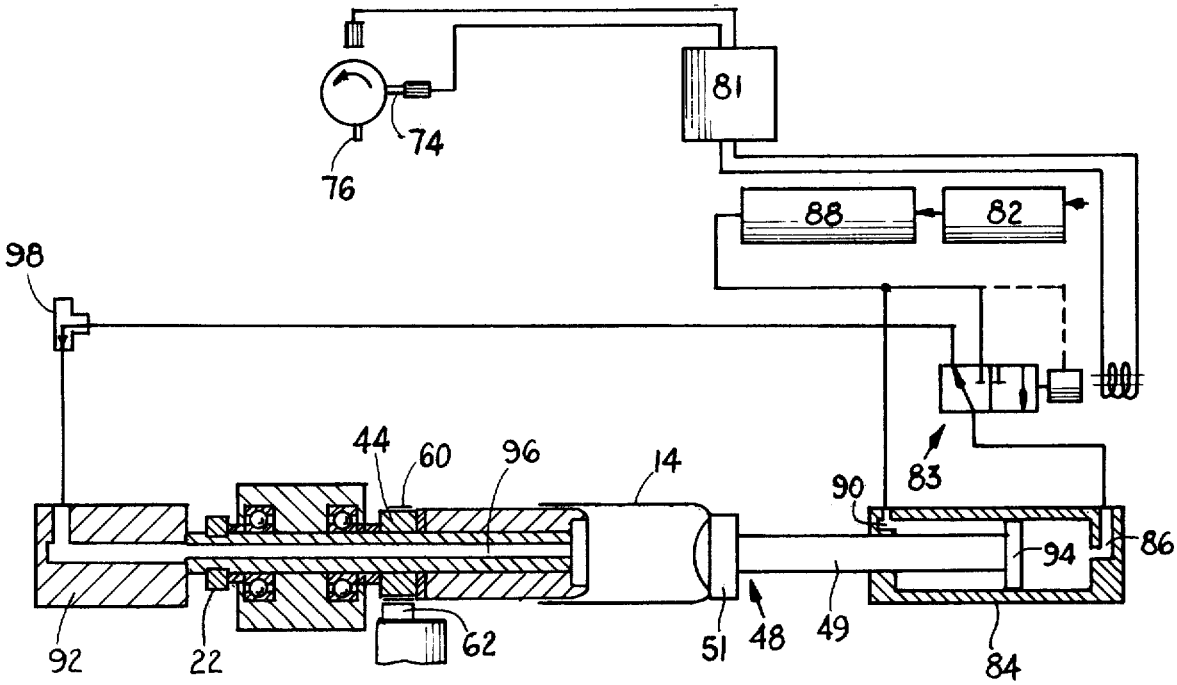

As knurling member 62 begins to form the second or third corrugation in the scrap, flag 74 will pass over sensor 78, which is now used for unloading, to de-energize load valve 83 and connect the right side (as shown in FIG. 7) of cylinder 84 with passage 96 through valve 98 and rotary union 92. Air pressure entering cylinder 84 through orifice 90 acts on piston 94 to retract loading ram 48. As the knurling of scrap continues, exhausting air rushing through passage 96 strips trimmed tubular body 14 off supporting member 30 to hold it against retracting ram 48 until it is replaced in the starwheel. During stripping, the continued rotation of knurling member 62 and knurling roller 44 completes the corrugation and discharge of scrap. This cycle may be described as the unload cycle. During the succeeding index cycle the trimmed can is moved away by starwheel 50 while the next untrimmed can is brought into alignment as previously described.

While in the foregoing specification this invention has been described in relation to certain preferred embodiments, and many details have been set forth for purpose of illustration, it will be apparent to those skilled in the art that the invention is susceptible to additional embodiments and that certain of the details described herein can be varied considerably without department from the basic principles of the invention.

We claim:

1. Apparatus for trimming uneven edges from drawn and ironed tubular metal bodies, comprising:

two substantially parallel shafts including a body-turning shaft and a tool shaft, said body-turning shaft having a free end;

a body-supporting member concentrically attached to said body-turning shaft at said free end;

an annular cutter member mounted concentrically on said body-turning shaft axially inwardly of said body-supporting member, said cutter member having a circumferential surface with an edge closest to said free end of radial dimension less than said supporting member, said surface tapering outwardly from said edge to a cutter edge axially remote from said free end;

a knurling roller mounted on said body-turning shaft axially inwardly of and adjacent to said cutter member, said knurling roller having circumferentially spaced teeth each extending radially to a position radially inward of said cutter edge, said supporting member, cutter member and knurling roller having a constant, rigid overall axial dimension;

means to fully load a tubular body on said supporting member with said uneven edge extending over said knurling roller and to hold said body in fixed axial position during operations thereon;

a rotating wheel mounted on said tool shaft;

a blade circumferentially mounted on a first sector of said wheel and having a peripheral edge aligned to cooperate with said cutter edge to trim from a tubular body and endless ring of metal having said uneven edge; and a knurling member circumferentially mounted on a second sector of said wheel, adjacent said first sector, and having a peripheral portion with radially extending teeth aligned to mesh with said knurling roller to break and knurl said endless ring, said teeth of said knurling member and roller being configured such that [ the intersections of ] all planes *extending through said knurling roller and knurling member, perpendicular to the axes of said knurling roller and knurling member and* normal to said shafts [ with each individual tooth ] are substantially congruent, and teeth on said knurling member closest said blade extend radially further than the remaining teeth thereon to mesh more deeply with said roller whereby to entrap and break said ring across its entire width.

2. The apparatus of claim 1 wherein said extended eeth are tapered to a smaller width toward their ends.

3. The apparatus of claim 2 wherein there are two xtended teeth.

4. The apparatus of claim 1 wherein there are two xtended teeth.

*5. Apparatus for trimming uneven edges from drawn nd ironed tubular metal bodies, comprising: two substantially parallel shafts including a body-turning shaft nd a tool shaft, said body-turning shaft having a free nd; a body-supporting member concentrically attached o said body-turning shaft at said free end; an annular utter member mounted concentrically on said body-urning shaft axially inwardly of said body-supporting nember, said cutter member having a cicumferential urface with an edge closest to said free end of radial imension less than said supporting member, said surface apering outwardly from said edge to a cutter edge axially emote from said free end; a knurling roller mounted on aid body-turning shaft axially inwardly of and adjacent o said cutter member, said knurling roller having circumferentially spaced teeth each extending radially to a osition radially inward of said cutter edge, said supporting member, cutter member and knurling roller having a onstant, rigid overall axial dimension; means to fully oad a tubular body on said supporting member with said neven edge extending over said knurling roller and to old said body in fixed axial position during operations hereon; a rotating wheel mounted on said tool shaft; a lade circumferentially mounted on a first sector of said heel and having a peripheral edge aligned to cooperate ith said cutter edge to trim from a tubular body an ndless ring of metal having said uneven edge; a knurling nember circumferentially mounted on a second sector of aid wheel, said second sector having one end directly djacent said first sector and having a peripheral portion ith radially extending teeth aligned to mesh with said nurling roller to break and knurl said endless ring; and t least one of said teeth of said knurling member extending radially further than the remaining teeth of said knurling member to mesh more deeply with said roller to break said ring across its entire width.*

*6. The apparatus of claim 5, in which said at least one of said teeth has a terminal edge extending parallel to the axis of its supporting shaft.*

*7. Apparatus for trimming uneven edges from drawn and ironed tubular metal bodies, comprising: two substantially parallel shafts including a body-turning shaft and a tool shaft, said body-turning shaft having a free end; a body-supporting member concentrically attached to said body-turning shaft at said free end; an annular cutter member mounted concentrically on said body-turning shaft axially inwardly of said body-supporting member, said cutter member having a circumferential surface with an edge closest to said free end of radial dimension less than said supporting member, said surface tapering outwardly from said edge to a cutter edge axially remote from said free end; a knurling roller mounted on said body-turning shaft axially inwardly of and adjacent to said cutter member, said knurling roller having circumferentially spaced teeth each extending radially to a position radially inward of said cutter edge, said supporting member, cutter member and knurling roller having a constant, rigid overall axial dimension; means to fully load a tubular body on said supporting member with said uneven edge extending over said knurling roller and to hold said body in fixed axial position during operations thereon; a rotating wheel mounted on said tool shaft; a blade circumferentially mounted on a first sector of said wheel and having a peripheral edge aligned to cooperate with said cutter edge to trim from a tubular body an endless ring of metal having said uneven edge; and a knurling member circumferentially mounted on a second sector of said wheel, said knurling member having one end abutting an adjacent end of said blade and having a peripheral portion with radially extending teeth aligned to mesh with said knurling roller to break and knurl said endless ring, and teeth on said knurling member closest said blade extend radially further than the remaining teeth thereon to mesh more deeply with said roller whereby to entrap and break said ring across its entire width.*

*8. Apparatus as defined in claim 7, in which said knurling roller has an adjacent edge radially aligned with said cutter edge so that said ring is placed on said knurling roll in position for knurling during the cutting operation.*

*9. Apparatus for trimming uneven edges from drawn and ironed tubular metal bodies, comprising two substantially parallel shafts including a body-turning shaft and a tool shaft, said body-turning shaft having a free end; a body-supporting member concentrically attached to said body-turning shaft at said free end; an annular cutter member mounted concentrically on said body-turning shaft axially inwardly of said body-supporting member, said cutter member having a circumferential surface with a cutter edge axially remote from said free end; and knurling roller mounted on said body-turning shaft axially inwardly of said cutter member with an edge radially aligned with said cutter edge, said knurling roller having radially extending teeth terminating inwardly of said cutter edge; a rotating wheel mounted on said tool shaft; a blade circumferentially mounted on a first sector of said wheel and having a peripheral edge aligned to cooperate with said cutter edge to trim from a tubular body an endless ring of metal having said uneven edge; and a knurling member circumferentially mounted on a second sector of said wheel, said knurling member having one end abutting an adjacent end of said blade and having a peripheral portion with radially extending teeth aligned to mesh with said teeth on said knurling roller to break and knurl said endless ring.*

* * * * *